UNITED STATES PATENT OFFICE.

JOHN B. LUNBECK, OF LEON, IOWA.

IMPROVEMENT IN COMPOUNDS FOR DESTROYING INSECTS, &c.

Specification forming part of Letters Patent No. 141,512, dated August 5, 1873; application filed June 28, 1873.

*To all whom it may concern:*

Be it known that I, JOHN B. LUNBECK, of Leon, in the county of Decatur and State of Iowa, have invented a new and useful Improvement in Insect-Destroyers, of which the following is a specification:

The object of this invention is to furnish a compound for the destruction of the "borer," and other worms, grubs, and insects, which prey upon fruit and other trees; and it consists in a liquid or semi-liquid compound, composed of the following ingredients, viz: One gallon pine tar; one quart soft soap; one-half pint of tobacco juice; one-half gallon strong alkali.

These ingredients are boiled together, and when well mixed the vessel containing the mixture is removed from the fire, and while still hot add one-half pint of unslaked lime and one pint of strong dry ashes. The lime and the ashes must be sifted through a fine sieve and then be well stirred in. I then add one ounce of oil of tansy, well combined by stirring. The compound should be of the consistency of thick paint, and, if too thick, may be brought to the proper consistency by adding strong hot alkali.

The compound is applied to the body of the tree, both above and below the surface of the ground, after excavating the earth and scraping the loose bark from the tree. A single coat of the compound applied with a common paint-brush is sufficient to protect the tree for one year. The excavated earth is replaced, and no borer or insect will molest the tree.

Having thus described my invention, I claim as new, and desire to secure by Letters Patent—

The above-described compound for destroying insects, worms, and grubs, and protecting fruit and other trees, composed and applied substantially as set forth.

JOHN B. LUNBECK.

Witnesses:
 FRANCIS VARGA,
 R. E. DYE.